J. W. HORTON.
DETECTING UNDERWATER VIBRATIONS.
APPLICATION FILED JUNE 24, 1919.
1,381,640.
Patented June 14, 1921.
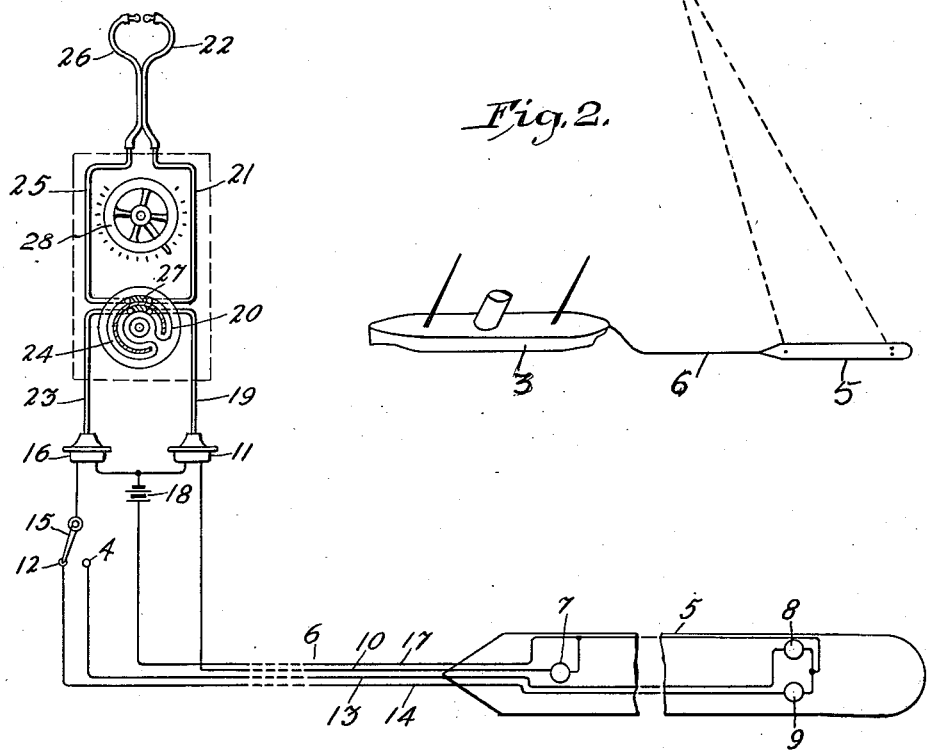
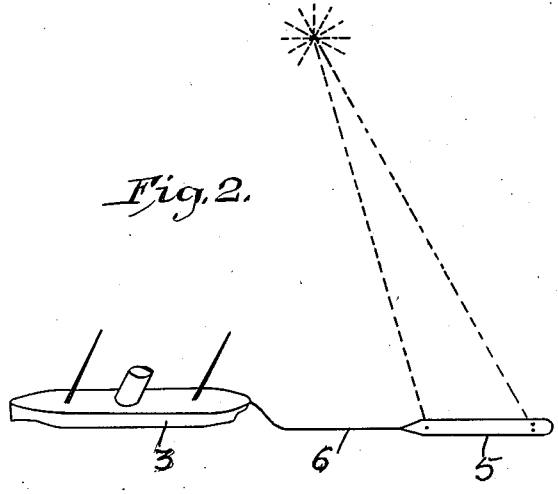
Inventor:
Joseph W. Horton
by J. E. Roberts Att'y.

UNITED STATES PATENT OFFICE.

JOSEPH WARREN HORTON, OF EAST ORANGE, NEW JERSEY, ASSIGNOR TO WESTERN ELECTRIC COMPANY, INCORPORATED, OF NEW YORK, N. Y., A CORPORATION OF NEW YORK.

DETECTING UNDERWATER VIBRATIONS.

1,381,640.

Specification of Letters Patent.

Patented June 14, 1921.

Application filed June 24, 1919. Serial No. 306,492.

*To all whom it may concern:*

Be it known that I, JOSEPH WARREN HORTON, a citizen of the United States, residing at East Orange, in the county of Essex, State of New Jersey, have invented certain new and useful Improvements in Detecting Underwater Vibrations, of which the following is a full, clear, concise, and exact description.

This invention relates to a method of and apparatus for the detection of under-water vibrations and the location of the point from which such vibrations are propagated. More particularly, this invention relates to a method of determining the location of a source of under-water sound by employing a towing device equipped with a plurality of detectors, obtaining a binaural balance, and then employing a second pair of detectors to eliminate the ambiguity of the first balance.

In the detection of under-water vibrations to locate the direction of a source of sound, it has been proposed to employ a towing device in which a pair of detectors are mounted and to determine the direction of the source of sound by listening to these devices binaurally. However, with such an arrangement, a certain ambiguity exists since it is possible to obtain a binaural balance which either indicates the true direction of the source of vibration or the image of this position. In other words, with one balance two positions are indicated, each making the same angle with the base line joining the two detectors. To eliminate this ambiguity, it has been proposed to obtain a binaural balance for a given position then alter the ship's course and obtain a second binaural balance from which it is generally possible to deduce the correct position of the source of sound. However, in some cases it is necessary to make even a third balance in order to positively determine the correct direction. Such a method for determining the location of the direction of sound is shown, for example, and described in a co-pending application to Harold De Forest Arnold, Serial No. 306,384, filed June 2, 1919.

It is the object of the present invention to provide apparatus and a method of using same which will permit the determination of the true location of the source of sound with the least possible delay and without altering the course of the towing vessel.

To accomplish this object and in accordance with a feature of this invention, there is provided apparatus for detecting underwater vibrations in which means is employed for towing three detectors in triangular formation. One of these detectors is towed somewhat ahead of the other two which are abreast and separated from each other a very short distance so that their base lines with the forward detector intersect to form a narrow V. There is also provided, in accordance with this invention, a method of detecting the source of under-water vibrations which consists in listening to one pair of detectors binaurally to obtain a balance and then to listen to one of the same detectors combined with a third detector to eliminate the ambiguity of the first balance, thereby determining the true location of the source of sound. These and other features of the invention will be more clearly understood by reference to the following description and the accompanying drawing in which Figure 1 shows schematically the apparatus required to determine the direction of the source of sound in accordance with the present invention and Fig. 2 shows the manner in which the device is employed.

Referring now to this drawing, there is disclosed a towing device or fish 5, which is adapted to be towed by means of the cable 6, from a vessel 3 upon which is located the necessary listening apparatus. The device 5 is preferably provided forward with a detector 7, while at the stern two detectors are provided side-by-side, the starboard one being designated as No. 8 and the port one as No. 9. The towing cable 6, in addition to having the necessary tensile strength for towing the device at all speeds, is also provided with a number of electrical conductors which provide the necessary connections between the device and the apparatus on the towing vessel. The detector 7, is connected by means of the conductor 10, to the receiver 11, while detectors 8 and 9 are connected, respectively, to the terminals 4 and 12 of a three-point switch by means of conductors 13 and 14. The arm 15 of this switch is connected to a second receiver 16 which has its other terminal connected in common with a terminal of receiver 11. The three detectors have their other terminal in common and are connected by means of conductors 17 to battery 18, the other terminal of which is connected to the common point of receivers 11 and 16. The receivers 11 and 16 are associated with a compensating device, by means of which it is possible to listen to their operation and obtain a binaural balance. Various types of acoustical compensators have been developed, such a device being shown, for example in a pending application of John J. Kuhn, Serial No. 306,449, filed June 24, 1919. Sound generated in the receiver 11 is transmitted to one ear of the listener by means of the fixed tube 19, adjustable tube 20, fixed tube 21, and stethoscopic ear tube 22. Sound generated in the receiver 16 is transmitted to the other ear of the observer by means of the fixed tube 23, adjustable tube 24, fixed tube 25, and stethoscopic ear tube 26. The adjustable tubes 20 and 24 are circular in form and reversed as shown, and are closed at the ends by means of the circular stops 27—27. These tubes are adapted to be rotated by means of the handle 28 while the stops 27 are held stationary, thus making it possible to increase the length of one tube and simultaneously decrease the length of the other tube. When rotated in a clockwise direction, the length of tube 20 is increased and the length of tube 24 is decreased. On the contrary, if rotated in a counterclockwise direction, the length of tube 20 is decreased and that of tube 24 is increased.

With the position of arm 15 of the three-point switch as shown, it is possible to listen binaurally to the detectors 7 and 9, while if the switch-arm 15 is thrown to the position 4, the observer listens binaurally to the detectors 7 and 8.

The method of determining the true location of the source of sound in accordance with this invention is as follows:

The device is towed behind a vessel and at some distance therefrom in order to eliminate, so far as possible, disturbances resulting from the beating of the waves against the hull of the towing vessel and the action of the propeller. The three-point switch is set in the position as shown so that it is possible to listen binaurally to detectors 7 and 9. Any disturbances affecting detector 7 are conducted electrically to receiver 11 and thence acoustically to tube 22 which is preferably inserted in the left ear of the observer. Sounds picked up by detector 9 are transmitted electrically to receiver 16 and thence acoustically to tube 26 which is inserted in the right ear of the observer. By rotating the handle 28 of the compensating apparatus a binaural balance is obtained which indicates both the true direction of the source of sound and its image. To eliminate this ambiguity, the switch-arm 15 is then thrown to position 4, thereby connecting detector 8 to receiver 16 and thence to the right ear of the observer. By thus switching detector 8 to the righ ear of the observer in place of detector 9, the length of the path to the source of sound is decreased if this source is located to starboard, while the length of path from the source of sound is increased if the direction of sound is to port. Therefore, if the observer, after getting his first binaural balance between detectors 7 and 9 then throws the switch to connect in detector 8 in place of detector 9, the source of sound appears to him to come from either the left or the right of the point indicated by his balance. Now, if the source of sound appears to come from the right, the arrangement of the apparatus is such as to indicate that the true source of sound is to starboard, whereas, if the source of sound appears to move to the left, the source of sound is to port, thus eliminating the ambiguity of the binaural balance made between detectors 7 and 9 without even taking the necessary time to obtain a balance between detectors 7 and 8 although this latter balance can be taken if desired to use as a check on the preceding balance.

This method of detecting under-water vibrations is applicable to very rapid manipulation since it is only necessary to make one binaural balance then throw the switch-arm 15 and to determine from the apparent change in direction which of the two directions indicated is the true direction of the source of vibration.

What is claimed is:

1. The method of determining the direction of a source of under-water sound which consists in towing through the water a group of three detectors spaced fixed distances apart in the form of a narrow V, obtaining a binaural balance between the detector mounted at the point of the V and one of the other detectors and then comparing said first detector with the other of said detectors.

2. The method of determining the direction of a source of under-water sound which consists in towing through the water a pair of detectors spaced abreast and close to each other, towing a third detector spaced a fixed distance apart from and on a line perpendicular to the line joining said pair of detectors, obtaining a binaural balance between the third detector and one of the pair of detectors and then comparing the third detector with the other of said pair of detectors.

3. The method of determining the direction of a source of under-water sound which consists in towing through the water a pair of detectors mounted abreast and to the rear of a third detector which is mounted on a line perpendicular to the line joining the other two detectors, obtaining a binaural balance between the forward detector and one of the rear detectors and then comparing the forward detector with the other rear detector without obtaining a binaural balance.

4. The method of determining the direction of a source of under-water sound which consists in towing a group of three detectors through the water, obtaining a binaural balance between a pair of said detectors and then comparing the response of one of said pair of detectors with the third detector, whereby the direction of the source of vibration may be determined without additional binaural balances.

5. The method of determining the direction of a source of under-water sound which consists in towing through the water a plurality of detectors, obtaining a binaural balance between a pair of said detectors and then suddenly changing to a second pair of detectors the base line of which makes a slightly different angle with the direction of the source of sound and noting the response.

6. In apparatus for determining the direction of under-water vibrations, the combination with a towing vessel of a device to be towed, a plurality of detectors mounted on said device in the form of a narrow V and spaced fixed distances apart, means for obtaining a binaural balance between a pair of detectors, and means for comparing one of said pair of detectors with a third detector.

7. In apparatus for determining the direction of under-water vibrations, the combination with a towing vessel of a device to be towed, a plurality of detectors mounted upon said device in the form of a narrow V, means for obtaining a binaural balance between the detector mounted at the point of the V and one of the rear detectors, means for interchanging the connections of said rear detectors, and means for comparing the response of the forward detector with the other of said rear detectors.

8. In apparatus for determining the direction of under-water vibrations, the combination with a towing vessel of a device to be towed, a group of three detectors mounted on said device in the form of a narrow V the point of the V being directed forward, means for binaurally comparing the response of the forward detector with one of the rear detectors, means for listening to the response of said detectors, means for compensating for the difference in the time of arrival of the sound to be detected at said pair of detectors, and means for comparing the response of said forward detector with the other of said rear detectors.

9. In apparatus for determining the direction of under-water vibration, the combination with a towing vessel of a device to be towed, a group of three detectors mounted on said device in the form of a narrow isosceles triangle, means for obtaining a binaural balance between a pair of said detectors, and means for comparing one of said pair of detectors with the third detector.

10. In apparatus for determining the direction of under-water vibrations, the combination with a towing vessel of a device to be towed, a plurality of detectors mounted on said device and spaced fixed distances apart, means for obtaining a binaural balance between a pair of detectors and means for suddenly changing to a second pair of detectors the base line of which makes a slightly different angle with the direction of the source of sound.

11. In apparatus for determining the direction of under-water vibrations, the combination with a towing vessel of a narrow elongated device to be towed, a detector mounted at one end of said device, a pair of detectors mounted abreast at the other end, and means for obtaining a binaural balance between the response of the single detector and the response of either of the detectors mounted abreast.

In witness whereof, I hereunto subscribe my name this 16th day of June, A. D. 1919.

JOSEPH WARREN HORTON.